Dec. 19, 1967     D. S. CHISHOLM     3,358,325
CURVE TRACING AND APPARATUS THEREFOR
Filed March 28, 1966
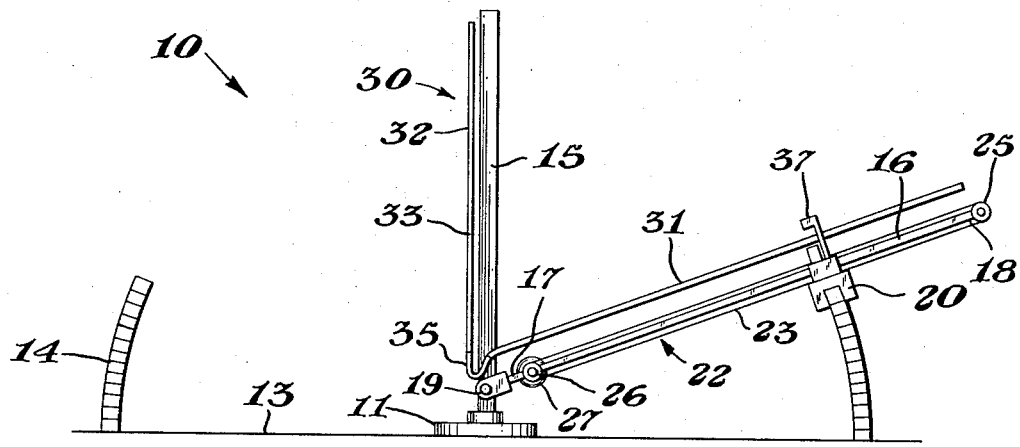
INVENTOR.
Douglas S. Chisholm
BY
AGENT United States Patent Office 3,358,325
Patented Dec. 19, 1967

3,358,325
CURVE TRACING AND APPARATUS THEREFOR
Douglas S. Chisholm, Midland, Mich., assignor to The Dow Chemical Company, Midland, Mich., a corporation of Delaware
Filed Mar. 28, 1966, Ser. No. 537,935
15 Claims. (Cl. 18—5)

ABSTRACT OF THE DISCLOSURE

Curves of various types are traced by liquid level in a manometer. Building construction of curved surfaces is controlled by such an apparatus.

This invention relates to curve tracing and an apparatus therefor, and in particular relates to the tracing of curves employing manometric means and manometric apparatus for the tracing of curves.

Oftentimes, it is desirable to trace a curve having a relatively large dimension with a high degree of accuracy. Circles of large size are traced with a relatively high degree of accuracy by employing the pivot arm. However, when non-circular curves are desired, the problem becomes more difficult. Oftentimes in the fabrication of structures such as are set forth in U.S. Patent No. 3,206,899 wherein a material depositing head is rotated, it is highly desirable that such structures be held to a relatively accurate curvature in order that the maximum physical strength be obtained per unit weight of material.

It would be very desirable if there were available an apparatus and method for the tracing of curves of large size with a high degree of accuracy.

It would also be desirable if there were available an apparatus and method for the generation of curves particularly of a non-circular nature which could readily be employed to guide a material depositing head.

It would also be desirable if such an apparatus could be readily modified to trace curves of varying types.

It would also be desirable if such a method and apparatus would trace irregular curves.

These features and other advantages in accordance with the present invention are achieved in a method of tracing a curve, the method comprising providing a conduit having a first leg and a second leg, the first and second leg of the conduit being disposed in angular relationship to each other, each leg of the conduit having an open end, disposing a liquid within the conduit which will flow at a desired rate under the influence of gravity, varying the angular relationship of at least one leg of the conduit with respect to a horizontal plane to cause the level of the liquid within one leg to trace a curve. Also contemplated within the scope of the present invention is a curve tracing apparatus comprising a support means, the support means having a first arm, the first arm being pivotly mounted to the support means by a pivot, a conduit having a first leg and a second leg, each leg of the conduit having an open end, a liquid disposed within the conduit, one leg of the conduit affixed to the pivot arm and adapted to pivot therewith and means to determine the level of liquid in the leg affixed to the pivotal arm.

Further features and advantages of the present invention will become more apparent from the following specification when taken in connection with the drawing wherein:

FIGURE 1 is a schematic representation of a structure forming apparatus employing curve tracing means in accordance with the present invention;

FIGURE 2 is a schematic representation of an apparatus which traces a parabola;

FIGURE 3 is a schematic representation of an apparatus which traces a hyperbola;

FIGURE 4 schematically depicts an apparatus which traces a parabola;

FIGURE 5 schematically represents an apparatus which permits tracing of curves below the pivot point;

FIGURE 6 schematically depicts an apparatus capable of tracing a hyperbola, parabola or ellipse;

FIGURE 7 depicts an embodiment of the invention which traces an irregular curves; and FIGURE 8 is a schematic representation of an apparatus which traces a portion of cardioid.

In FIGURE 1 there is illustrated a schematic sectional representation of the present invention in combination with a material depositing apparatus generally designated by the reference numeral 10. The apparatus 10 comprises in cooperative combination the fixed base 11, the fixed base 11 is disposed upon a foundation or surface 13 generally normal to the force of gravity. A portion 14 of a circular structure is disposed generally symmetrically about the base 11, the base 11 carries a generally vertically projecting support arm 15, the support arm 15 has rotatably affixed thereto a first arm 16 having a first end 17 and a second end 18. The first end 17 of the arm 16 is pivotally affixed to the base 11 by a pivot 19 which permits pivoting of the arm 16 in a plane normal to the surface 13 and in a plane generally normal to the axis of the support arm 15, the arm 16 has slidably disposed thereon a depositing head 20 such as is disclosed in U. S. 3,206,899. The material depositing head 20 is positioned on the arm 16 by means of a positioning apparatus 22 which comprises in cooperative combination a cable or chain 23 which is supported at the second end 18 of the arm 16 by a pulley or sheave 25 and at the first end 17 of the arm 16 by the pulley or sheave 26 rigidly affixed to a driving shaft or motor 27. A conduit generally designated by the reference numeral 30 is secured to the arms 15 and 16, the conduit 30 comprises a first leg 31 and a second leg 32 having disposed therein a liquid 33, the legs 31 and 32 are connected adjacent the pivot 19 by a flexible conduit or connection 35, the liquid 33 is sufficiently fluid that it flows within the conduit 30 at a desired rate. Beneficially, the leg 31 may be prepared of transparent material so that the fluid level is readily apparent. Similar material may be utilized for the leg 32. A liquid level sensing means 37 is affixed to the material depositing head. Beneficially, the liquid level sensing means provides means to actuate the motor 27 through the line 38 to position the material depositing head in fixed relationship to the liquid level in the arm 31 of the conduit 30.

In operation of the apparatus 10 of the FIGURE 1, the material depositing head 20 and the arm 16 are rotated about the support arm 15 and the material deposited to form a structure such as the structure portion of 14. The position of the material depositing head 20 is positioned along the arm 16 in accordance with the liquid level in the leg 31, a suitable sensing means such as the means 37, which may be photoelectric, capacitative or conductive or any of the other well known liquid level sensing means, controls the motor 27 which in turn positions the head 20 in a desired location which is controlled by the relative dimensions of the legs 32 and 31 of the conduit 30. For example, if the legs 31 and 32 have equal internal diameters, that is, equal bores, the head 20 will trace a parabola having its focus at the pivot 19. Thus, the structure prepared by the apparatus 10 would have a parabolic configuration in a plane perpendicular to the base 13.

In FIGURE 2, the manometer or conduit generally designated by the reference numeral 30 of the FIGURE 1 illustrates the relationship of the legs 31 and 32 and the flexible conduit 35 and the liquid 33. When the leg 31 is maintained in a vertical position, the liquid in the leg 32 traces a parabola or portion thereof as the leg is pivoted about a point of intersection common to the axes of each of the legs 31 and 32.

In FIGURE 3 there is depicted an alternate manometric device generally illustrated by the reference numeral 40. The device 40 comprises a first leg 41 and a second leg 42. The legs 41 and 42 are joined by means of a flexible conduit 43 in a manner of the device 30 of FIGURES 1 and 2. The leg 42 is disposed at an angle $\phi$ from the vertical. As the leg 41 pivots about the intersection of the axis of the legs 41 and 42, the liquid level 44 of the liquid 45 traces a hyperbola.

FIGURE 4 schematically represents an alternate means of tracing the parabola. The device is generally designated by the reference numeral 50. The device 50 comprises a manometer 51 having a first arm 52 and a second arm 53 having a flexible connection 54 therebetween. A liquid 55 is disposed within the manometer 51. The arm 52 of the manometer is secured to a first pivot member 56 which pivots about the point 57. A second pivot member 58 is pivoted to the arm 56 at the pivot point 59 and is secured to the arm 53 of the manometer 51. A weight 60 maintains pivot member 58 in a vertical position. On movement of the member 56 about the pivot point 57, the liquid level in the arm 52 traces a parabola as the arm 53 of the manometer 51 is maintained in vertical position. The constants of the parabola may be readily altered by altering the position of the point 59 with respect to the pivot point 57.

In FIGURE 5 there is depicted an alternate embodiment of the invention generally designated by the reference numeral 65. The embodiment 65 comprises a manometer 66 having a first leg 67, a second leg 68 pivotally connected to the first leg 67 by means of a flexible conduit 69 and a third leg 70. The third leg 70 is affixed to a lower end 71 of the leg 67. A pivot point 72 is disposed between an upper end 73 of the first leg 67. A liquid 74 is disposed within the manometer 66. The manometer 66 conveniently has a bore sufficiently small that capillary action prevents the liquid from pouring therefrom when the leg 68 is disposed below the horizontal as depicted in FIGURE 5. This embodiment of the invention permits a parabola to be generated wherein the length of the parabola curve traced is greater than that which can be obtained employing manometers with a movable leg of comparable length and greater bore.

In FIGURE 6 there is depicted a further embodiment of the invention generally designated by the reference numeral 80. The embodiment 80 comprises a manometer 81 having a vertical leg 82 and a movable leg 83. The legs 82 and 83 are joined at a pivot point 84 by means of flexible conduit 85. The cross-sectional area of the vertical leg 82 is $E \times A_2$ and the cross-sectional area of the other leg is $A_2$. When E is greater than one, the hyperbola is generated; when E is equal to one, a parabola is generated; and when E is less than one, an ellipsoidal curve is generated as the leg 83 is moved with respect to the leg 82.

In FIGURE 7 there is depicted an alternate embodiment of the invention generally designated by the reference numeral 90. The embodiment 90 comprises a manometer 91 having a first or vertical leg 92 of varying cross-section and a second or movable leg 93 of constant cross-section. The leg 92 has an upper end 94 and a lower end 95. The movable leg 93 is connected to the lower end 95 of the leg 92 by means of a flexible conduit 96. Pivoting the leg 93 about a pivot point disposed at the lower end of the leg 92 causes the liquid level of the second or movable leg 93 to trace an irregular curve depending upon the particular cross-sectional configuration of the leg 92.

In FIGURE 8 there is depicted an alternate curve tracing device in accordance with the invention generally designated by the reference numeral 100. The curve tracing device 100 comprises a manometer 101 having a first leg 102 and a second leg 103. The legs 102 and 103 have a common junction 104 and the legs 102 and 103 are disposed in fixed angular relationship to each other. The manometer 101 contains a mobile liquid 102 disposed therein. At the common junction 104 is a pivot 107 so constructed and arranged as to permit rotation of the manometer 101 in a plane containing the legs thereof. On rotation of the manometer, the liquid in the leg 103 traces a pattern which corresponds to a cardioid wherein manometer 101 contains a mobile liquid 106 disposed on the opposite side of the pivot to the leg tracing pattern.

In the practice of the present invention, a wide variety of materials may be employed for the construction of the manometric devices and indicating means. Liquid level following apparatus such as photoelectric cells, capacitance bridges and the like are well known in the art. The particular device selected will depend primarily upon the particular and specific application and the engineering requirements thereof. Such selection is well within the skill of those familar with mechanical and electrical control apparatus. Beneficially, it is oftentimes desirable to employ for the manometer legs transparent plastic tubing such as nylon 66 tubing or polyvinylchloride tubing which may be rigidly supported and is not subject to fracture as readily as are glass tubes. Oftentimes, in the use of thermoplastic tubing rather than glass tubing, it is desirable to calibrate the tubes in terms of their volume per unit length in order to be assured that the required degree of precision will be obtained. Usually, for many applications such as the control of apparatus such as is illustrated in FIGURE 1 for the preparation of walled structures, a high degree of precision is not necessary and tolerances in the final structure of one-quarter to one-half inch are considered eminently satisfactory.

Generally, in the construction of walled structures in a manner similar to that of FIGURE 1, it is oftentimes desirable to employ for the manometer legs flexible plastic tubing such as polyvinylchloride of a relatively small diameter such as that having an internal diameter of about three-sixteenth of an inch. Upon the completion of a project, it may be readily removed from the apparatus and the apparatus disassembled and moved to another site. When employing transparent plastic tubing, usually it is beneficial to utilize colored water and a photoelectric control means. Such colored liquids as writing inks are usually eminently satisfactory. If, after a period of service the plastic tubing becomes discolored, it can be discarded and replaced at small cost or the coloring material removed by washing with water or suitable solvent. Utilizing the manometric tracing apparatus as hereinbefore described in cooperative combination with a foamed structure apparatus such as is depicted in FIGURE 1, large and small structures of dome-like configuration are readily prepared and resultant structures are highly accurate.

As is apparatus from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for tracing a curve, the method comprising providing
   a conduit having two open ends, a passage therein, the conduit having a first leg and a second leg, the first and second leg of the conduit being disposed in angular relationship to each other, disposing a liquid within the conduit which will flow at a desired rate under the influence of gravity, varying the angular relationship of at least one leg of the conduit with respect to a horizontal plane to cause the level of the liquid within at least one leg to trace a curve as the leg is rotated about a pivot point.

2. The method of claim 1 wherein one leg of the conduit is maintained in a vertical position.

3. The method of claim 1 wherein the cross-sectional configuration of the passage within the legs of the conduit within which the liquid is disposed has a constant cross-sectional area.

4. The method of claim 1 wherein one leg of the conduit is maintained in a vertical position and the vertical leg of the conduit has a varying internal cross-sectional area.

5. The method of claim 1 wherein one leg of the conduit is maintained in a non-vertical position.

6. The method of claim 1 wherein the legs of the conduit have a common pivot point.

7. The method of claim 6 wherein one of the legs is maintained in a vertical position and the conduit is pivoted about a fixed point remote from either leg of the manometer.

8. The method of claim 1 wherein the conduit has a first vertical leg and a second pivoting leg, the first vertical leg being connected to the pivoting leg by means of a U-shaped portion extending below the pivot point.

9. The method of claim 1 wherein each leg of the conduit is in fixed angular relationship to the other and is pivoted about the junction of the legs.

10. A curve tracing apparatus comprising a support means, the support means having a first arm, the first arm being pivotally mounted to the support by means of a pivot, a conduit having a first leg and a second leg, each leg of the conduit having an open end, a liquid disposed within the conduit, one leg of the conduit affixed to the pivot arm and adapted to pivot therewith, and means to determine the level of liquid in the leg fixed to the pivot arm.

11. The apparatus of claim 10 including a vertically positioned arm, the remaining leg of the conduit being affixed to the vertically positioned arm and the first and second legs of the conduit being in communication by means of a flexible connection.

12. The apparatus in accordance with claim 10 wherein the first leg of the conduit is vertically disposed and the second leg of the conduit is attached to the first leg by means of a flexible conduit.

13. The apparatus of claim 10 wherein the first and second legs are disposed in fixed angular relationship to each other.

14. The apparatus of claim 10 wherein the pivot arm has disposed thereon a second arm, the second arm being pivotally affixed to the pivot arm at a point remote from the support, one leg of the conduit being affixed to the second arm and means to maintain the first arm in a vertical position.

15. The apparatus in accordance with claim 10 in cooperative combination with a fixed base, the fixed base having disposed thereon a base pivot, the base pivot supporting a foam depositing apparatus, the foam depositing apparatus comprising at least one pivoted foam depositing head carrying arm, a foam depositing head positioning apparatus, means to detect the level of the liquid in one leg of the manometer and move the foam depositing head in direct relationship to the position of the liquid in the leg.

References Cited

UNITED STATES PATENTS

| | | | |
|---|---|---|---|
| 2,594,725 | 4/1952 | Britt | 18—1 X |
| 2,877,530 | 3/1959 | Winn | 25—1 |
| 2,979,798 | 4/1961 | Price | 25—13 X |
| 3,206,899 | 9/1965 | Wright | 52—80 |

WILLIAM J. STEPHENSON, *Primary Examiner.*